US 6,717,521 B1

(12) United States Patent
Leung

(10) Patent No.: US 6,717,521 B1
(45) Date of Patent: Apr. 6, 2004

(54) LAMINATOR DRAW CONTROL

(75) Inventor: Kwok Hung Leung, Chaiwan (HK)

(73) Assignee: Elesmart Limited, Kowloon (HK)

( * ) Notice: Subject to any disclaimer, the term of this patent is extended or adjusted under 35 U.S.C. 154(b) by 0 days.

(21) Appl. No.: 10/367,746

(22) Filed: Feb. 19, 2003

(30) Foreign Application Priority Data

Dec. 4, 2002 (CN) .......................................... 02 2 50023

(51) Int. Cl.[7] .............................................. G08B 21/00
(52) U.S. Cl. .................................. 340/675; 156/244.11
(58) Field of Search ..................... 340/675; 156/244.11, 156/244.23, 244.24, 244.26, 244.27

(56) References Cited

U.S. PATENT DOCUMENTS 3,826,487 A * 7/1974 Forster et al. ............... 271/263
5,306,381 A * 4/1994 Nakazawa et al. .......... 156/359

* cited by examiner

Primary Examiner—Julie Lieu
(74) Attorney, Agent, or Firm—Leydig, Voit & Mayer, Ltd.

(57) ABSTRACT

A thickness sensor for layered sheet material entering a lamination machine includes an arm movable upon interaction with the layered sheet material. A variable resistance output dependent upon the position of the arm controls the speed of rotation of heated rollers in the lamination machine so that the layered sheet material will be drawn through the machine with variable speed to better infuse thermal adhesive into the material should such material be detected.

9 Claims, 4 Drawing Sheets

LAMINATOR DRAW CONTROL

BACKGROUND OF THE INVENTION

The present invention relates to laminators of the type used to laminate a sheet such as a photograph, certificate or chart for example between a pair of transparent plastics sheets. More particularly, although not exclusively, the invention relates to a laminator having a mechanism for detecting the thickness of the layers to be laminated and means for adjusting the through-speed of the sheets past the laminator's heating rollers depending upon the detected thickness.

Known laminators comprise a pair of internally heated rollers that are biased toward one another or at a fixed spacing and in between which the layers to be laminated are pressed. The heat from the rollers melts an adhesive surface on each of the plastics sheets and the melted laminate infuses to some extent into the sheet that is being laminated. Cards and thin paper are relatively straightforward to laminate because a pre-set temperature and speed setting of the rollers achieves the necessary adhesion between the layers. However, when a thick sheet of cardboard for example is to be laminated, the pre-set temperature and speed setting can result in insufficient adhesive penetration to the cardboard, and consequent ease of delamination of the finished product. For this reason, the laminated finished product might have to be passed a second time through the machine and perhaps even a third. This can result in loss of productivity or even damage to the finished product.

OBJECTS OF THE INVENTION

It is an object of the present invention to overcome or substantially ameliorate the above disadvantage and/or more generally to provide a thickness sensor for a lamination machine and a lamination machine incorporating a thickness sensor and speed-controlled lamination/heating rollers.

DISCLOSURE OF THE INVENTION

There is disclosed herein a thickness sensor for layered sheet material entering a lamination machine, comprising:
    an arm movable upon interaction with the layered sheet material, and
    means providing variable resistance output dependent upon the position of the arm.

Preferably the means providing variable resistance comprises an electrical conductor mounted to the arm and providing a pair of exposed electrical contacts, and a printed circuit board (PCB) having exposed tracks engaged by respective ones of the electrical contacts, and resistors electrically connecting adjacent portions of at least one of the tracks.

Preferably the tracks each comprise an end portion electrically isolated from one another and engaged by respective ones of the electrical contacts for indicating that the lamination is too thick.

Preferably one of said end portions comprises a sub portion electrically isolated therefrom and engaged by one of the electrical contacts for providing a warning signal that the lamination is of maximum allowable thickness.

Preferably the arm is pivotally mounted upon a pivot pin and the tracks are curved.

Preferably the arm comprises a roller at one end engagable with the layered sheet material and the pivot pin is closer to the roller than it is to the electrical contacts.

There is further disclosed herein a lamination machine comprising:
    a pair of heated rollers between which layers of sheet material are pressed for lamination, and
    the above-disclosed thickness sensor attached to the machine at a location upstream of the rollers and cooperating with the machine to vary the speed of rotation of the rollers.

Preferably at least one of said rollers is driven by an electric motor, the operational speed of which is affected by the thickness sensor.

Preferably the machine further comprises a pair of withdrawal rollers downstream of the heated rollers.

Preferably the withdrawal rollers rotate in unison with the heated rollers via a gear train therebetween.

BRIEF DESCRIPTION OF THE DRAWINGS

A preferred form of the present invention will now be described by way of example with reference to the accompanying drawings, wherein.

DESCRIPTION OF THE PREFERRED EMBODIMENT

Figure 1:
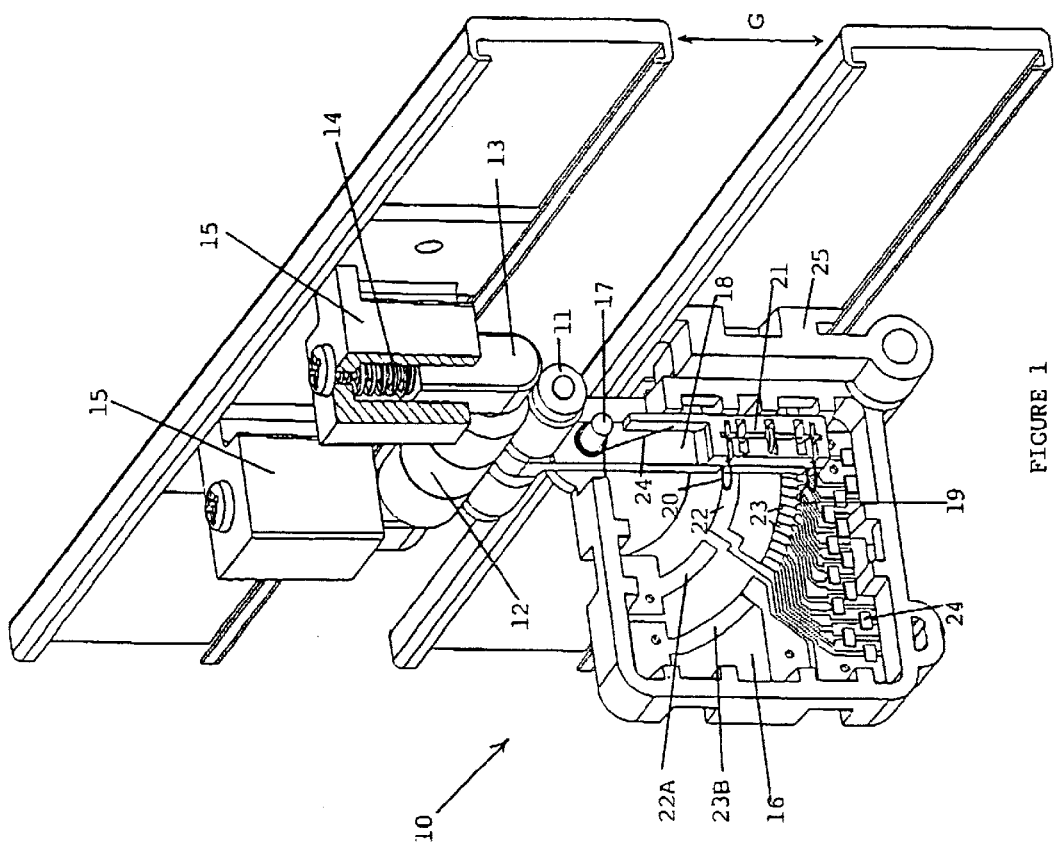
FIG. 1 is a schematic perspective illustration of a thickness sensor for layered sheet material.
Figure 2:
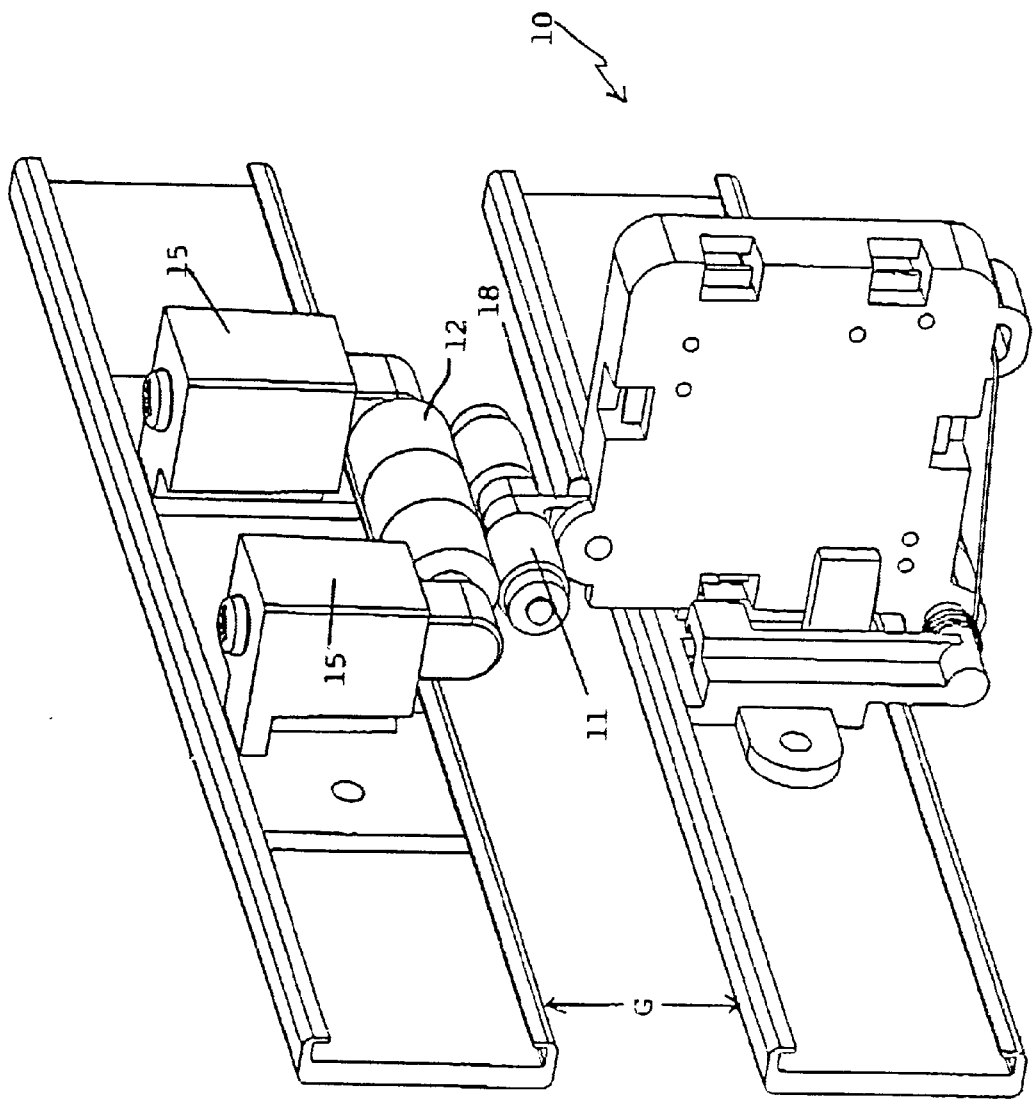
FIG. 2 is a schematic perspective illustration of the thickness sensor of FIG. 1 when viewed from another angle.
Figure 3:
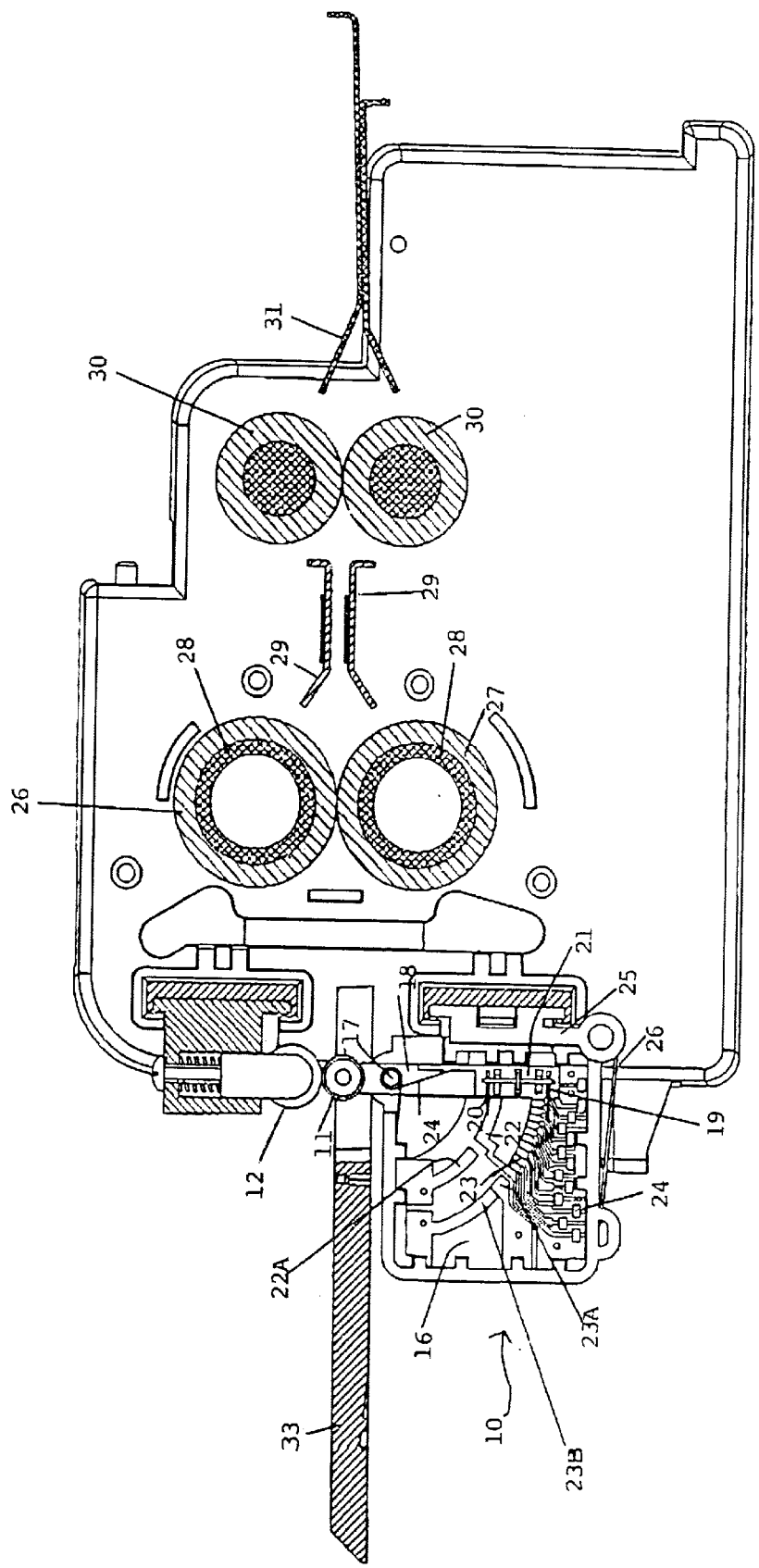
FIG. 3 is a schematic cross-sectional elevational view of a lamination machine having attached thereto the thickness sensor of FIGS. 1 and 2.
Figure 4:
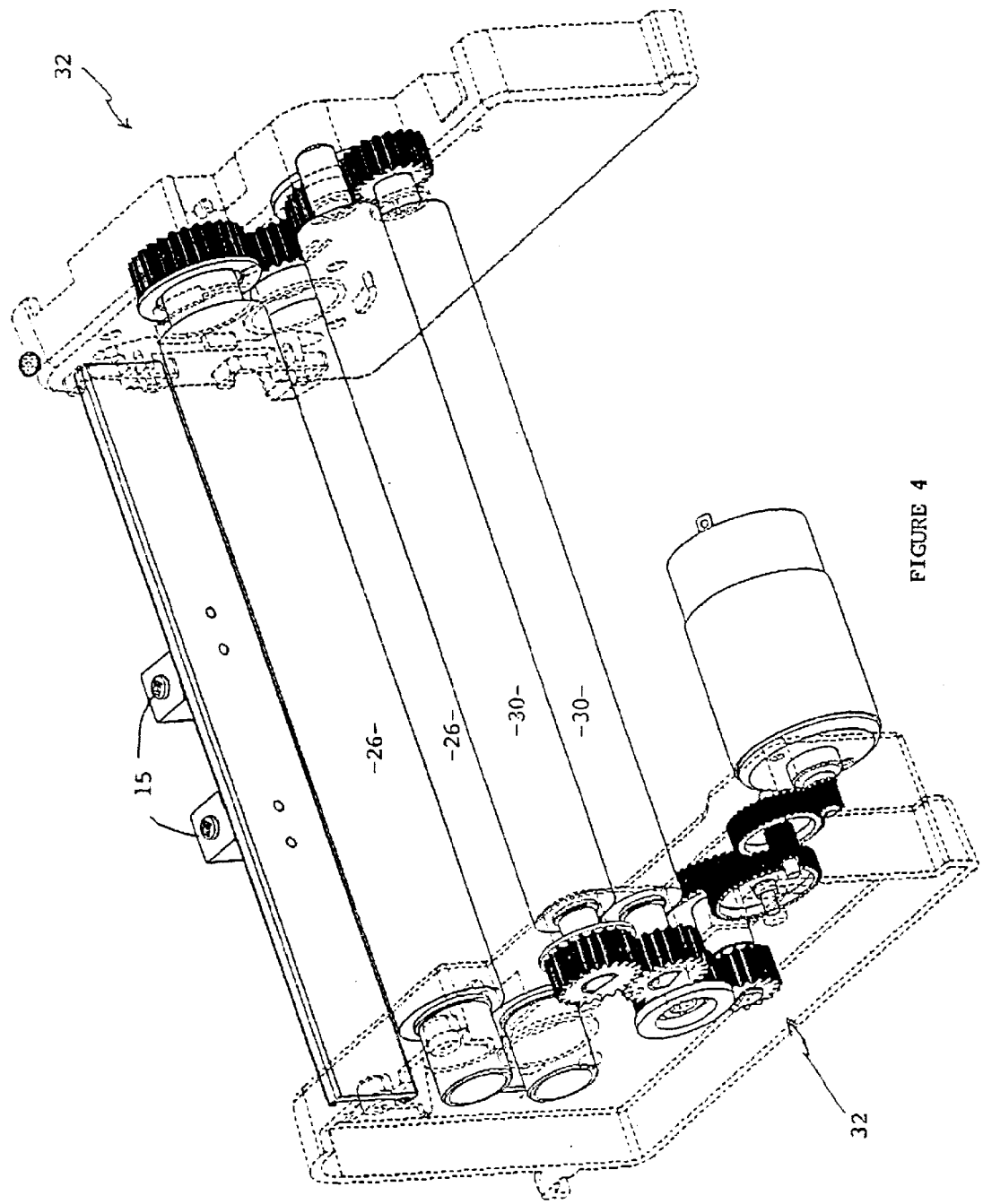
FIG. 4 is a schematic perspective illustration of the rollers and gear train ensuring rotation of the rollers in unison.

In FIGS. 1 and 2 of the accompanying drawings there is depicted schematically a thickness sensor 10. Sensor 10 comprises a casing within which there is mounted a printed circuit board (PCB) 16. There is an arm 18 mounted upon a pivot pin 17 about which a coil spring 24 is wound. The coil spring lightly biases the arm into the orientation depicted in the Figures. One end of the arm extends out of a casing and supports rollers 11 to bear against the downward-facing surface of a stack of three sheets to be laminated. This would usually be the bottom transparent plastics sheet, between two of which a photograph for example is to be laminated.

There is an idler 12 positioned above the roller 11 mounted at each end by an idler support 13. Each idler support 13 projects telescopically and downwardly from a spring casing 15 within which a coil spring 14 is located. The coil spring 14 maintains the idler 12 at a datum position, but allows for upward movement of the idler 12, should the overall height of the layered sheets of material be too high. Should such be the case, the lamination machine will shut down by virtue of a feature to be described later.

The arm 18 has an electrically conductive bus 21 therein. There are two springs 19 and 20 that extend from the bus to a position between the arm 18 and the PCB 16. There might be electrical brushes attached to the springs 19 and 20 for engagement with tracks 22 and 23 formed upon the PCB 16. Alternatively, the springs might bear directly upon the tracks.

As shown in FIG. 1, the distance between the pivot pin 17 and the rollers 11 is significantly less than the distance between the pivot pin 17 and the electrical contacts and tracks 22 and 23. This ensures that small pivotal movements of the roller-end of the arm 18 result in large movements of the electrical contacts and thus a relatively large-scale PCB design can be adopted.

One of the tracks 22 is substantially continuous, but includes an electrically isolated end portion 22A. The other track 23 is divided into a plurality of short segments attached electrically and in sequence with surface-mounted resistors 24. Alongside the track portion 22A, the track 23 comprises electrically isolated portions 23A and 23B.

As the layers of sheet material engaged the roller 11, the arm 18 pivot about pivot pin 17 against spring 24. The contact brushes attached to the springs 19 and 20 then ride along the tracks 22 and 23. As contact is made with adjacent ones of the short segments of track 23, resistance of the sensor 10 changes. This provides a near-continuous variable resistance that can be used to control the speed at which the rollers (to be described later) are driven.

When the arm 18 is aligned across portions 22A and 23A, a warning signal such as "beep" sound is made or a warning light is illuminated to indicate that the material being laminated is at or very close to the maximum allowable limit. If the arm 16 aligns across track portions 22A and 23B, a shut-off condition results, as a jam would be inevitable.

The thickness sensor 10 is attached to a lamination machine by a mounting 25 from which there extends a mounting spring 26 that passes through an eye 34 to retain the sensor.

The lamination machine itself comprises a pair of heated feed rollers comprising a resilient rolling surface 26 surrounding a heater 28. At least one of these would be driven by an electric motor (not shown). There is also a pair of downstream withdrawal rollers 30, at least one of which is driven to rotate in unison with the feed rollers 26. A pair of gear trains 32 achieves this, one at each end of the rollers. In order to cause rotation of the rollers, an electric motor can be coupled to any one of the gears of one or both gear trains 32, or one of the rollers directly.

Situated in between the feed rollers and the withdrawal rollers is an additional heater 29.

In use, sheets to be laminated are presented at the upstream end of the lamination machine, perhaps upon a support tray 33. The sheets are fed by hand into the machine whereupon the bottom sheet engages the roller 11. In turn, the arm 18 takes on a pivotal orientation indicative of the thickness of the stack of sheets thereby inducing an appropriate resistance in the sensor 10. This resistance is read and relayed to the motor to affect the throughput speed of the material. The feed rollers draw the sheets in at a speed appropriate for the material thickness and heat is applied by the heaters 28 to soften the adhesive on the inwardly facing surfaces of the outer plastics layers. The molten adhesive is then at least partially infused into the middle layer. The supplementary heaters 29 then apply further heat to the sheet en route to the withdrawal rollers 30 that are rotating in unison with the feed rollers. The withdrawal rollers also have a resilient surface to press the sheets together and then present the sheets at a dispensing tray 31 for collection.

It should be appreciated that modifications and alterations obvious to those skilled in the art are not to be considered as beyond the scope of the present invention. For example, the arm might move linearly instead of pivotally and the rollers might be caused to rotate in unison by means other than a gear train. Furthermore, instead of and/or in addition to controlling the draw speed, the thickness sensor's resistance reading might be used to control the heat produced by the heaters.

What is claimed is:

1. A thickness sensor for layered sheet material entering a lamination machine, comprising:
   an arm movable upon interaction with the layered sheet material, and
   means providing variable resistance output dependent upon the position of the arm wherein the means providing variable resistance comprises an electrical conductor mounted to the arm and providing a pair of exposed electrical contacts, and a printed circuit board having exposed tracks engaged by respective ones of the electrical contacts, and resistors electrically connecting adjacent portions of at least one of the tracks.

2. The thickness sensor of claim 1 wherein the tracks each comprise an end portion electrically isolated from one another and engaged by respective ones of the electrical contacts for indicating that the lamination is too thick.

3. The thickness sensor of claim 2 wherein one of said end portions comprises a sub portion electrically isolated therefrom and engaged by one of the electrical contacts for providing a warning signal that the lamination is of maximum allowable thickness.

4. The thickness sensor of claim 1 wherein the arm is pivotally mounted upon a pivot pin and the tracks are curved.

5. The thickness sensor of claim 4 wherein the arm comprises a roller at one end engagable with the layered sheet material and the pivot pin is closer to the roller than it is to the electrical contacts.

6. A lamination machine comprising:
   a pair of heated rollers between which layers of sheet material are pressed for lamination, and
   the thickness sensor of claim 1 attached to the machine at a location upstream of the rollers and co-operating with the machine to vary the speed of rotation of the rollers.

7. The lamination machine of claim 6 wherein at least one of said rollers is driven by an electric motor, the operational speed of which is affected by the thickness sensor.

8. The lamination machine of claim 6 further comprising a pair of withdrawal rollers downstream of the heated rollers.

9. The lamination machine of claim 8 wherein the withdrawal rollers rotate in unison with the heated rollers via a gear train therebetween.

* * * * *